United States Patent
Scott-Collins et al.

(10) Patent No.: US 11,230,228 B2
(45) Date of Patent: Jan. 25, 2022

(54) PIVOT DETENT SYSTEM AND REAR VIEW DEVICE THEREWITH

(71) Applicant: SMR Patents S.à.r.l., Luxembourg (LU)

(72) Inventors: Callum Scott-Collins, Portchester (GB); Andrew Lettis, Portchester (GB)

(73) Assignee: SMR Patents S.à.r.l., Luxembourg (LU)

( * ) Notice: Subject to any disclaimer, the term of this patent is extended or adjusted under 35 U.S.C. 154(b) by 150 days.

(21) Appl. No.: 16/616,008

(22) PCT Filed: May 18, 2018

(86) PCT No.: PCT/EP2018/063076
§ 371 (c)(1),
(2) Date: Nov. 22, 2019

(87) PCT Pub. No.: WO2018/215336
PCT Pub. Date: Nov. 29, 2018

(65) Prior Publication Data
US 2020/0139890 A1 May 7, 2020

(30) Foreign Application Priority Data
May 24, 2017 (DE) .................. 10 2017 111 461.0

(51) Int. Cl.
*B60R 1/076* (2006.01)
(52) U.S. Cl.
CPC .................. *B60R 1/076* (2013.01)
(58) Field of Classification Search
CPC .................................................. B60R 1/076
USPC .................. 359/841, 872; 350/877
See application file for complete search history.

(56) References Cited

U.S. PATENT DOCUMENTS

| | | | |
|---|---|---|---|
| 5,005,797 A | 4/1991 | Maekawa et al. | |
| 5,684,646 A * | 11/1997 | Boddy | B60R 1/074 359/841 |
| 6,322,221 B1 * | 11/2001 | van de Loo | B60R 1/074 359/841 |
| 6,371,619 B1 * | 4/2002 | Assinder | B60R 1/06 359/841 |
| 6,481,858 B2 * | 11/2002 | Inagaki | B60R 1/06 248/476 |
| 6,811,270 B2 * | 11/2004 | Yoshida | B60R 1/06 359/507 |

(Continued)

FOREIGN PATENT DOCUMENTS

| EP | 0807551 A2 | 11/1997 |
|---|---|---|
| EP | 3141429 A1 | 3/2017 |

OTHER PUBLICATIONS

International Search Report dated Aug. 6, 2018 of International application No. PCT/EP2018/063076.
(Continued)

*Primary Examiner* — Ricky D Shafer
(74) *Attorney, Agent, or Firm* — Jones Day

(57) ABSTRACT

A pivot detent system acts between two components that rotate with respect to one another around an axis to control rotation from a first set position to at least a second set position with each of said two components including a cylindrical section and a resilient means being arranged within a cylindrical space between the cylindrical sections to act between the two components.

11 Claims, 1 Drawing Sheet

(56) References Cited

U.S. PATENT DOCUMENTS

| | | | | |
|---|---|---|---|---|
| 7,165,852 | B2* | 1/2007 | Pavao | B60R 1/06 248/479 |
| 8,336,845 | B1* | 12/2012 | Courbon | B60R 1/076 248/479 |
| 2008/0062545 | A1 | 3/2008 | Su | |
| 2009/0147388 | A1* | 6/2009 | Mendoza | B60R 1/076 359/871 |
| 2011/0069406 | A1* | 3/2011 | Hwang | B60R 1/074 359/841 |
| 2014/0146407 | A1 | 5/2014 | Tseng | |

OTHER PUBLICATIONS

Written Opinion dated Aug. 6, 2018 of International application No. PCT/EP2018/063076.

* cited by examiner

PIVOT DETENT SYSTEM AND REAR VIEW DEVICE THEREWITH

CROSS REFERENCE TO RELATED APPLICATIONS

This application is a National Stage Entry of International Patent Application No. PCT/EP2018/063076, filed May 18, 2018, which claims the benefit of foreign priority to German Patent Application No. DE 10 2017 111 461.0, filed May 24, 2017, each of which is hereby incorporated by reference in its entirety for all purposes.

BACKGROUND

1. Field of the Invention

The following disclosure refers to a pivot detent system that acts between two components that rotate with respect to one another around an axis to control rotation from a first set position to at least a second set position, with each of said two components comprising a cylindrical section and a resilient means being arranged within a cylindrical space between said cylindrical sections to act between said two components. It also relates to a rear view device with a base to be fixed to a vehicle, a head rotatable relative to the base and said pivot detent system.

2. Related Art

EP 0 711 682 A1 describes such a detent system. The known detent system acts between two components that rotate with respect to one another to control rotation from a first set position to at least a second set position that comprises at least one rotating cam positioned between adjacent surfaces of said two components and spaced from the axis of rotation of said two components, said cam being journalled for rotation on one of said components about an axis that is substantially transverse to the axis of rotation between said two components, the operating surface of said cam comprising at least one cam lobe that is caused to rotate as said two components rotate and acts to separate said components, and resilient means acting between said two components to urge said adjacent surfaces together and one of said adjacent surfaces against said cam so that a predetermined torque is required to cause relative rotation between said components, said predetermined torque being set by the force applied by said resilient means resulting from the extent of compression of said resilient means when said two components separate upon rotation. Upon relative rotation between the two components, the cam is caused to rotate and the upward path of a lobe causes the two components to be separated as the lobe is brought between the adjacent component and the axis of rotation of the cam.

SUMMARY

In an aspect, at least one detent ring is arranged within a cylindrical space between cylindrical sections with the detent ring being moveable together with a first component relative to a second component when overcoming a predetermined torque to break a detent engagement between the detent ring and the second component by deflecting the resilient means.

In an example, the first component is provided with a step between a narrow segment of the cylindrical section and a broad segment of the cylindrical section against which a shoulder of the second component is forced by the resilient means acting on the detent ring.

In an example, that the narrow segment of the first component fits into a cylindrical opening of the second component, the detent ring is located inside the second component and around the narrow segment of the first component, and the resilient means, preferably comprising a coil spring, is extending between the detent ring and a supporting means.

In an example, a bayonet is locked to the case frame both along the z-axis which is parallel to the pivot axis, preferably using the compressional loading provided by the coil spring, and rotationally about the pivot axis.

The support means, in particular including the bayonet, can extend along the radial inward side of the narrow segment, preferably embracing the cylindrical section of the first component and/or abutting against the upper side of the step of the first component.

In an example, the detent ring engages the first component via a first detent engagement, with the first detent engagement preferably comprising at least one first detent of the detent ring extending radial inwardly to engage a respective recess provided by the narrow segment of the cylindrical section of the first component; and/or engages the second component via a second detent engagement in the at least one second set position, with the second detent engagement preferably comprising at least one second detent of the detent ring extending radial outwardly; and/or engages the second component via a third detent engagement in the first set position, with the third detent engagement preferably comprising at least on third detent of the second component within a recess of the detent ring extending parallel to the axis.

In an example, the second component provides at least one channel within which the second detent of the detent ring can move, with each channel preferably being defined between two fourths detents of the second component extending radial inwardly.

In an example, a third detent is provided at the underside of the shoulder of the second component and can be moved out of the recess of the detent ring by deflecting the spring to allow for the detent ring being rotate together with the first component within the angular section defined by the channel of the second, fixed component.

The first, second, third and/or fourth detent(s) can have a substantially trapezoidal cross-section, preferably with smoothened edges.

In another aspect, a rear view device includes a base which is fixed to a vehicle, a head rotatable relative to the base and a pivot detent system, wherein the first component is part of or fixedly connected to the head and the second component is part of or fixedly connected to base.

In an example, the first set position is defined by the driving position of the head, and a first second set position is defined by the parking position of the head, and/or a second second set position is defined by the knocked out position of the head.

The detent system of the present disclosure may be adapted for an external rear view device having a head which can be moved relative to a fixed base, as for example described in EP 16198759.9. The moveable head can include one or more reflective elements and/or one or more cameras. When the head is disengaged from its normal position, which can be the driving position and is defined by detents of the pivot detent system, to change into a parking position or a knocked forward position, defined by further detents, the respective rotation is performed without any lift of the head. This is achieved due to the interposition of an independent detent ring which elevates by reacting against the force of a resilient means providing a pivot spring. In fact, the detents securing the driving position can be disengaged by applying a predetermined rotational force resulting in deflecting the pivot spring and thereby moving the detent ring. As the pivot spring deflects during rotation, the head is not lifted.

According to various aspects, embodiment of the present disclosure are ideally suited to manufacturing many of the components from polymeric materials. As such, manufacturing is simple and inexpensive.

BRIEF DESCRIPTION OF THE DRAWINGS

The invention may be best understood with reference to the following description of embodiments taken together with the accompanying schematic drawings.

DETAILED DESCRIPTION

Figure 1:
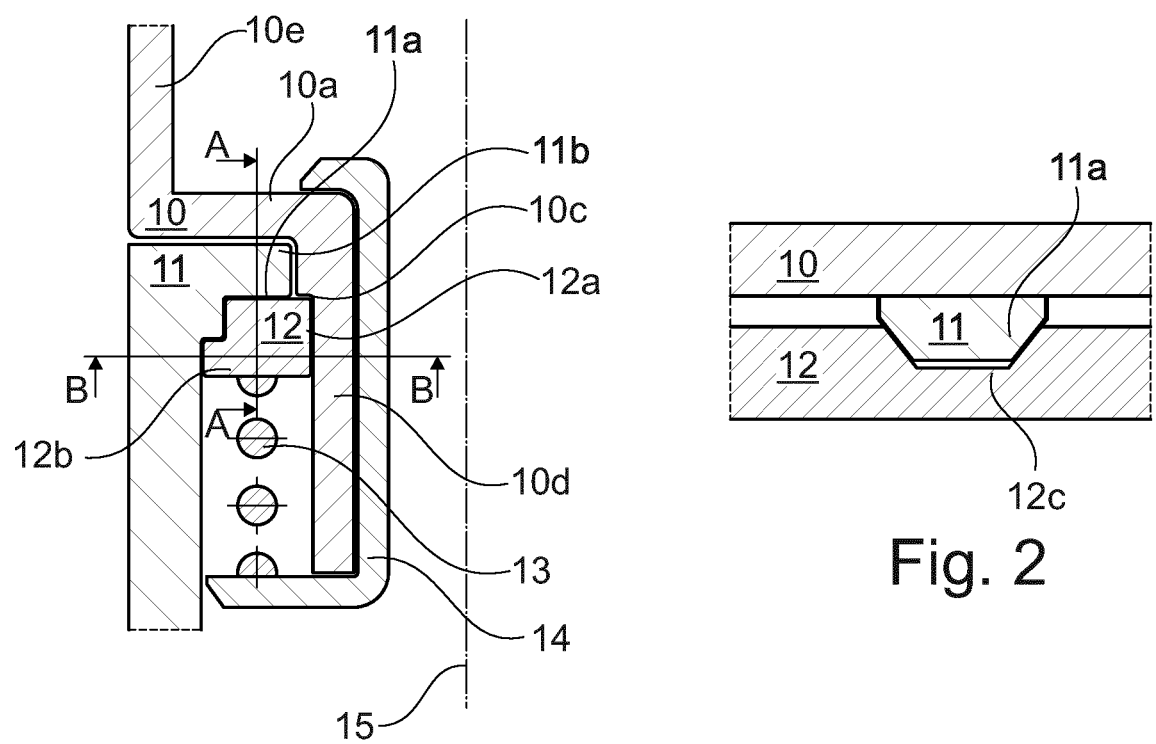
FIG. 1 is a section view of the detent system radial in the plane of the pivot axis.
Figure 2:
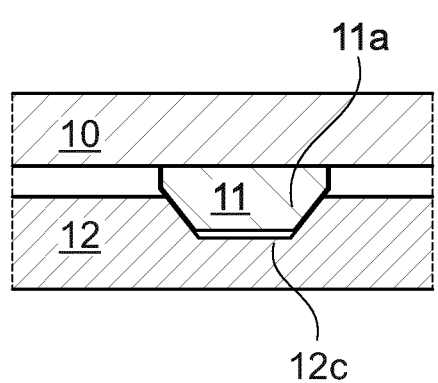
FIG. 2 is a section view of FIG. 1 parallel to the pivot axis along the line A-A.
Figure 3:
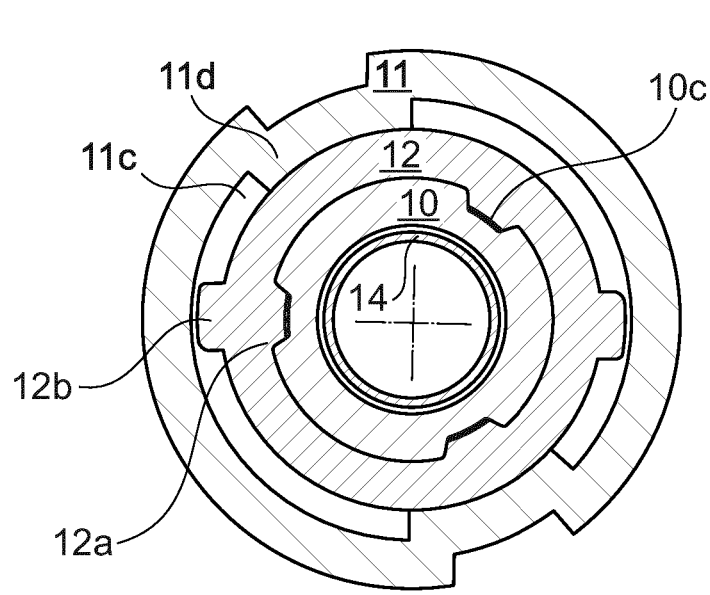
FIG. 3 is a section view of FIG. 1 perpendicular to the pivot axis along the line B-B.

A pivot detent system of the invention, in particular for a not shown external rear view device, is shown in FIGS. 1 to 3 and comprises a case frame 10, a base frame 11, a detent ring 12, a pivot spring 13 and a bayonet 14.

The base frame 11 belongs to a base, which can be fixed to a vehicle, and is provided in form of a cylindrical section with a shoulder 11b. The case frame 10 belongs to a case or rather head, which can rotate around an axis 15 relative to the base and carries at least one reflective element and/or camera. Still further, the case frame 10 is provided in form of a cylindrical section with a step 10a such that there is a narrow lower segment 10d and a broader upper segment 10e. The base frame 11 is arranged concentrically around the case frame 10 below the step 10a and, thus, in the region of the narrow lower segment 10d with the upper side of the shoulder 11b abutting against the underside of the shoulder 11b as shown in FIG. 1. Above the shoulder 11a the radial outer surfaces of the base part 10 and the frame part 11 are aligned to flush with each other.

The narrow segment 10d of the case frame 10 fits into the cylindrical opening of the base frame 11 such that the case frame 10 rests on the base frame 11. The detent ring 12 is located inside the base frame 11 around the narrow segment 10d of the case frame 10 between both frames 10, 11 and is hold by the spring 13, preferably being a coil spring. The spring 13 is supported by the bayonet 14 that encompasses the narrow part 10d of the case frame 10 from within the pivot detent system.

Thus a ring space is provided between the two frames 10, 11 below the shoulder 11b and above the lower end of the bayonet 14, with the detent ring 12 and the spring 13 being arranged within this space. The detent ring 12 is abutting against the underside of the shoulder 11b with the spring 13 forcing the detent ring 12 against the base part 11 in the region, which in turn urges the base part shoulder 11b against the frame part step 10a, as long as the spring 13 is supported by the bayonet 14. The bayonet 14 extends from the lower end of the spring 13 along the inner surface of the case frame 10 up to the step 10a such that it embraces the lower segment 10d of the case frame 10 and, thus, the cylindrical region housing the detent ring 12 and the spring 13. In fact, the bayonet 14 holds the pivot spring system together and allows an easy assembly as well as disassembly.

The detent ring 12 is provided with at least one first detent 12a for engaging the case frame 10 and, thus, acting as a key, and at least one second detent 12b which can move within a channel defined by the base frame 11 with the second detent 12b acting as a stop as explained with respect to FIGS. 2 and 3 in the following.

FIG. 2 shows a cross section taken along line A-A in FIG. 1 such that it depicts the interaction of the relevant parts of the pivot detent system of the invention in a vertical section running in parallel to the axis 15. Accordingly the shoulder 11b of the base frame 11 is provided with a third detent 11a resting within a recess 12c of the detent ring 12 in the normal position of the pivot detent system, which can be the driving position of the rear view device. The geometry of the recess 12c is complementary to the one of the third detent 11a, with the cross section of the third detent 11a is in the form of a trapeze with smoothened edges.

FIG. 3 shows a cross section taken along line B-B in FIG. 1 such that it shows the interaction of the relevant parts of the pivot detent system of the invention in a horizontal section running perpendicular to the axis 15. Accordingly, the bayonet 14 is arranged in the middle with the case frame 10 being arranged around the bayonet 14, the detent ring 12 being arranged around the case frame 10 and the base frame 11 being arranged around the detent ring 12. The detent ring 11 can rotate together with the case frame 12 and the bayonet 14 due to the engagement via three first detents 12a. The respective rotation is restricted by two fourth detents 11d of the base frame 11 defining two channels 11c within which the two second detents 12b of the detent ring 12 can move. The two ends of the channels 11c define two positions, one could be a parking position and the other could be a knocked out position with the driving position being shown in FIG. 3. The driving position is arranged between the parking position and the knocked out position.

The interaction of the parts of the pivot detent system of the invention when being forced out of its normal/driving position will be described in the following with reference to FIGS. 1 to 3:

In order to set the detent ring 12 into rotational motion around the pivot axis 15 and relative to the base frame 10, the engagement of the detent 11a of the case frame 11 within the recess 12c of the detent ring 12 has to be overcome. This is achieved by pushing the detent ring 12 against the spring 13 such that a predetermined torque can be overcome to break out the case frame 11 and, thus, the head. This results in moving the detent 11a out of the recess 12c allowing the detent ring 12 to rotate together with the case frame 10 within the boundaries defined by the channels 11c. The detent 11a is acting as a manual fold detent.

Due to the fact that the spring 13 deflects, neither the detent ring 12 nor the case frame 10 and, thus, the head are lifted or rather do have to be lifted for allowing a rotation.

The case frame 10 can take the detent ring 12 along during rotation as soon as the detent 11a has disengaged the recess 11c due to a vertical movement of the detent ring 12 that is performed against the force of the spring 13, as the first detents 12a of the detent ring 12 secure the attachment to the case frame 10. The second detents 12b of the detent ring 12 as well as the fourth detents 11d of the base frame 11 provide stops, respectively defining the parking and knocked out positions.

Although modifications and changes may be suggested by those skilled in the art, it is the intention of the application to embody within the patent warranted hereon all changes and modifications as reasonably and probably come within the scope of this contribution to the art. The features of the present invention which are believed to be novel are set forth in detail in the appended claims. The features disclosed in the description, the figures as well as the claims could be essential alone or in every combination for the realization of the invention in its different embodiments.

REFERENCE SIGNS 10 case frame
10a step
10c recess
10d narrow segment
10e broad segment
11 base frame
11a third detent
11b shoulder
11c channel
11d fourth detent
12 detent ring
12a first detent
12b second detent
12c recess
13 coil spring
14 bayonet
15 pivot axis

What is claimed is:

1. A pivot detent system, comprising
two components, between which the pivot detent system acts, that rotate with respect to one another around an axis to control rotation from a first set position to at least a second set position, each of the two components, comprising
a cylindrical section; and
a resilient means being arranged within a cylindrical space between the cylindrical sections to act between the two components,
wherein at least one detent ring is arranged within the cylindrical space between the cylindrical sections, with the detent ring being moveable together with a first component relative to a second component when overcoming a predetermined torque to break a detent engagement between the detent ring and the second component by deflecting the resilient means,
wherein the detent ring engages the second component via a second detent engagement in the at least one second set position, with the second detent engagement comprising at least one second detent of the detent ring extending radial outwardly, and
wherein the second component provides at least one channel within which the second detent of the detent ring can move, with each channel being defined between two fourth detents of the second component extending radial inwardly.

2. The pivot detent system of claim 1, wherein the first component is provided with a step between a narrow segment of the cylindrical section and a broad segment of the cylindrical section against which a shoulder of the second component is forced by the resilient means acting on the detent ring.

3. The pivot detent system of claim 2, wherein the narrow segment of the first component fits into a cylindrical opening of the second component, the detent ring is located inside the second component and around the narrow segment of the first component, and the resilient means comprises a coil spring and extends between the detent ring and a supporting means.

4. The pivot detent system of claim 3, further comprising the support means comprising a bayonet and extending along a radial inward side of the narrow segment at least one of embracing the cylindrical section of the first component or abutting against the upper side of the step of the first component.

5. The pivot detent system of claim 1, further comprising a bayonet that is locked to a case frame both along a z-axis which is parallel to the pivot axis using the compressional loading provided by the coil spring and rotationally about the pivot axis.

6. The pivot detent system of claim 1, wherein the detent ring engages the first component via a first detent engagement, with the first detent engagement comprising at least one first detent of the detent ring extending radial inwardly to engage a respective recess provided by a narrow segment of the cylindrical section of the first component.

7. The pivot detent system of claim 6, wherein one or more of the first, second, third, or fourth detent has a substantially trapezoidal cross-section with smoothened edges.

8. The pivot detent system of claim 1, wherein the detent ring engages the second component via a third detent engagement in the first set position, with the third detent engagement comprising at least one third detent of the second component within a recess of the detent ring extending parallel to the axis.

9. The pivot detent system of claim 1, wherein the third detent is provided at the underside of a shoulder of the second component and can be moved out of the recess of the detent ring by deflecting the spring to allow for the detent ring being rotated together with the first component within the angular section defined by a channel of the second, fixed component.

10. A rear view device comprising:
a base to be fixed to a vehicle;
a head rotatable relative to the base; and the pivot detent system of claim 1,
wherein the first component is part of or fixedly connected to the head and the second component is part of or fixedly connected to base.

11. The rear view device of claim 10, wherein the first set position is defined by a driving position of the head, and at least one of
a first second set position is defined by a parking position of the head, or
a second second set position is defined by a knocked out position of the head.

* * * * *